United States Patent Office 3,838,135
Patented Sept. 24, 1974

3,838,135
OXIMO TETRACYCLIC INDOLES
Ernest Magnien, Flushing, and Juta Cabilio, Bronx, N.Y., assignors to USV Pharmaceutical Corporation, Tuckahoe, N.Y.
No Drawing. Filed Oct. 18, 1972, Ser. No. 298,658
Int. Cl. C07d 33/50
U.S. Cl. 260—288 R    10 Claims

ABSTRACT OF THE DISCLOSURE

Compounds of the structure

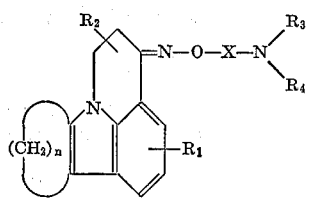

wherein $n$ is an integer from 4–6, $R_1$ is hydrogen, lower alkyl, lower alkoxy, or halogen, $R_2$ is hydrogen or lower alkyl, $R_3$ and $R_4$ are lower alkyl or cycloalkyl or taken together with the N to which they are attached, are pyrrolidino, piperidino, morpholino, or piperazino, have hypotensive activtiy.

---

This invention relates to new organic compounds having valuable pharmacological activity and to processes for the preparation of said compounds. In particular, the invention relates to oxime ether derivatives of tetracyclic indoles of the formula

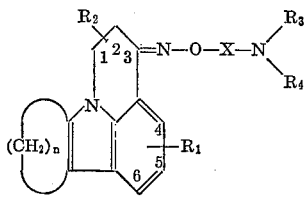

and their pharmaceutically acceptable, non-toxic acid addition salts wherein $n$ is an integer from 4 to 6 inclusive,
$R_1$ is hydrogen, lower alkyl, lower alkoxy, or halogen,
$R_2$ is hydrogen or lower alkyl,
$R_3$ and $R_4$ are lower alkyl or cycloalkyl and may be the same or different, or $R_3$ and $R_4$ taken together with the N to which they are attached, may be heterocyclic such as pyrrolidino, morpholino, piperidino, thiomorpholino, piperazino and the like, and
X is a lower alkylene.

The lower alkyl and lower alkoxy groups contain from 1 to 6 carbon atoms and may be straight chained or branched. The lower alkyl groups include methyl, ethyl, propyl, isopropyl, butyl, sec-butyl, isobutyl, amyl, isoamyl, hexyl and the like. The lower alkoxy groups include methoxy, ethoxy, isopropoxy, butoxy, amyloxy and the like. The cycloalkyl group contains from 3–7, preferably 5 or 6, carbon atoms. The lower alkylene (X) group contains from 2–6 carbon atoms and may also be straight chained or branched. The halogen atoms are preferably chloro or fluoro.

Suitable acids used in forming the acid addition salts of the compounds of the present invention include hydrochloric, hydrobromic, phosphoric, sulfuric, acetic, propionic, benzoic, hydroxybenzoic, salicylic, mandelic, succinic, citric, malic, maleic, fumaric, tartaric, nicotinic, and the like.

Preferably, $n$ is 5 or 6, $R_1$ is hydrogen, chloro or fluoro, and is in the 5-position, $R_2$ is hydrogen, and $R_3$ and $R_4$ are methyl.

According to one process of the present invention, the compounds of the present invention are prepared by the reaction of an oxime of the formula

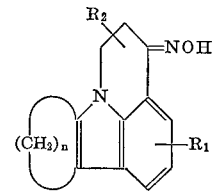

with an aminoalkyl halide of the formula

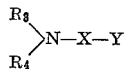

wherein $n$, $R_1$, $R_2$, $R_3$, $R_4$ and X are the same as above and Y is a halogen atom, preferably chlorine.

In a variation of this process, the oxime may be treated with a halodialkylamide to form a dialkylamidoalkyl derivative of the oxime, which amide derivative may be reduced to give the desired amine.

The intermediate oximes may be obtained by a series of reactions (as described by Hahn et al. in Soc. Sci. Lodz Acta Chim., 13, 59 (1968)) starting with a Fisher indole reaction of a cyanoethylated phenylhydrazine and a cycloalkyl ketone to give a cyanoethylated indole of the formula

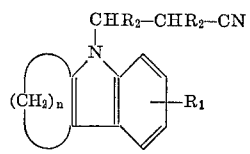

wherein $n$, $R_1$ and $R_2$ are the same as above, with the further proviso that at least one of the $R_2$'s is hydrogen.

The resulting nitriles are hydrolyzed to the carboxylic acids which are then cyclized by treatment with a dehydrating agent such as, for example, $P_2O_5$, to give ketones of the formula

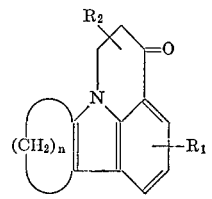

which are then oximated with hydroxylamine to give the desired intermediate oximes of the structure shown above.

The acid addition salts are readily obtained by adding equivalent amounts of the base and the desired acid in an inert solvent and isolating the salt.

The invention will be more fully understood from the examples which follows. These examples are given by way of illustration and are not to be considered as limiting. In these examples, Examples 1, 2 and 4 describe the preparation of intermediates and the remaining examples describe the preparation of the final products.

EXAMPLE 1

3-keto-12b-aza-1,2,3,12b-tetrahydrocyclooct-[a]acenapthylene

To 150 g. β-(2,3-cyclooctenoindolyl-1)-propionic acid, prepared according to the method described by Hahn et al., Soc. Sci. Lodz Acta Chim., *13*, 59 (1968), in 1.5 l. xylene was added 150 g. phosphorus pentoxide and 130 g. celite. The mixture was stirred and refluxed for 4 hrs. and then filtered. The filtrate on evaporation yielded 166 g. product, m.p. 77–82° C.

EXAMPLE 2

3-oximino-12b-aza-1,2,3,12b-tetrahydrocyclooct-[a]acenaphthylene

A solution of 131 g. 3-keto-12b-aza-1,2,3,12b-tetracyclooct[a]acenaphthylene, prepared in Example 1, in 100 ml. ethanol was added to a solution of 131 g. hydroxylamine hydrochloride and 262 g. sodium acetate trihydrate in 260 ml. water. The combined solution was stirred under reflux for 1 hour, and after cooling the precipitated product was filtered off to yield 98.6 g. after crystallization from benzene-hexane. It had a m.p. of 192–194° C.

EXAMPLE 3

3-[O-(3-dimethylaminopropyl)]-oximino-12b-aza-1,2,3,12b-tetrahydrocyclooct[a]acenaphthylene To a slurry of 3.8 g. (0.09 mol) 57% sodium hydride in 20 ml. dry toluene was added 20.1 g. (0.075 mol) 3-oximino - 12b - aza - 1,2,3,12b - tetrahydrocyclooct[a] acenaphthylene through Gooch tubing. The mixture was refluxed for 1 hour. A solution of 14 g. (0.115 mol) 3-chloro-N,N-dimethylpropylamine hydrochloride in water was basified and extracted with toluene three times. The toluene extract was dried over anhydrous MgSO₄ and added to the above mixture at room temperature. The resulting mixture was then stirred and refluxed for 17 hours. The cooled mixture was filtered and the filtrate evaporated to dryness. The residue was dissolved in isopropanol and treated with one equivalent of maleic acid in ether. The resulting salt was crystallized two times from acetonitrile-ether to yield 15.8 g., m.p. 161–163° C. The citrate salt had a m.p. of 106–108° C. A higher melting form (m.p. 157–159°) was also isolated.

EXAMPLE 4

3-[O-4-dimethylvaleramide]oximino-12b-aza-1,2,3,12b-tetrahydrocyclooct[a]acenaphthylene To a solution of 28.4 g. (0.106 mol) 3-oximino-12b-aza-1,2,3,12b-tetrahydrocyclooct[a]acenaphthylene in 90 ml. dry dimethylformamide was added 4.4 g. (0.106 mol) 57% NaH portionwise. The mixture was stirred at room temperature for 2 hours. A solution of 17.4 g. (0.106 mol) 5-chloro-N,N-dimethylvaleramide (made by the reaction of excess dimethylamine with 5-chlorovaleryl chloride) in 20 ml. toluene was added and the mixture was refluxed for 1 hour. The mixture was cooled to room temperature, 100 ml. water added, and the basic product extracted three times with benzene. The residue obtained on evaporation of the benzene extract was crystallized from ethyl acetate-hexane to yield 19.1 g. product, m.p. of 74–75° C.

EXAMPLE 5

3-[O-(5-dimethylaminopentyl)]oximino-12b-aza-1,2,3,12b-tetrahydrocyclooct[a]acenaphthylene A suspension of 2.9 g. (0.075 mol) lithium aluminum hydride in 200 ml. dry ether was stirred. To this was added, dropwise, a solution of 19 g. (0.048 mol) 3-[O-4-dimethylvaleramido]oximino-12b-aza-1,2,3,12b - tetrahydrocyclooct[a]acenaphthylene in 1.0 l. ether. The mixture was stirred at room temperature for sixteen hours, then decomposed by careful addition of 5 ml. of water. The inorganic salts were filtered off and the filtrate was evaporated to dryness to yield 10.3 g. of product. The crude base in methanol was treated with a slight excess of citric acid in ether. The crude citrate was filtered off and recrystallized twice to yield 4.4 g. product, m.p. 87:89° C.

Following the procedures described in the examples the following additional compounds were prepared, and their properties are given in Table I.

TABLE I

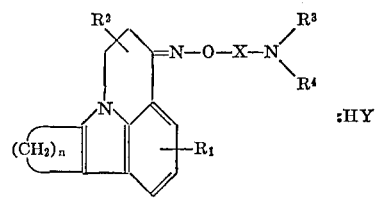

| n | R¹ | R² | R³ | R⁴ | X | HY | M.P.° C. |
|---|---|---|---|---|---|---|---|
| 6 | H | H | Me | Me | —(CH₂)₃— | Citrate | 104–108 (157–159) |
| 5 | H | H | Me | Me | —(CH₂)₃— | ___do___ | 170–172 |
| 5 | H | H | Et | Et | —(CH₂)₃— | Maleate | 95–99 |
| 4 | H | H | Me | Me | —(CH₂)₃— | ___do___ | 164–166 |
| 6 | H | H | Me | Me | —CH₂—CHCH₃ with CH₃ | ___do___ | 140–143 |
| 6 | H | H | —(CH₂)₄— | | —(CH₂)₃— | ___do___ | 148–150 |
| 6 | H | H | Me | Me | —(CH₂)₂— | Citrate | 124–127 |
| 6 | 5-Me | H | Me | Me | —(CH₂)₃— | ___do___ | 144–145 |
| 6 | 5-Me | H | —(CH₂)₄— | | —(CH₂)₃— | ___do___ | 94–95 |
| 6 | H | H | Et | Et | —(CY₂)₃— | ___do___ | 109–111 |
| 6 | H | H | Me | Me | —(CH₂)₄— | Maleate | 111–113 |
| 6 | H | H | Me | Me | —CH—CH₂— with CH₃ | Citrate | 87–90 |
| 6 | 5-OMe | H | Me | Me | —(CH₂)₃— | ___do___ | 103–107 |
| 6 | H | 1-Me | Me | Me | —(CH₂)₃— | ___do___ | 122–123 |
| 6 | 5-Cl | H | Me | Me | —(CH₂)₃— | ___do___ | 117–119 |
| 6 | H | 2-Me | Me | Me | —(CH₂)₃— | ___do___ | 121–123 |
| 6 | H | H | Me | Me | —(CH₂)₅— | ___do___ | 87–89 |
| 6 | 5-F | H | Me | Me | —(CH₂)₃— | ___do___ | 115–119 |
| 6 | H | H | Me | Me | —(CH₂)₆— | ___do___ | 93–94 |
| 6 | 6-Cl | H | Me | Me | —(CH₂)₃— | ___do___ | 84–88 |

The compounds of the present invention exhibited long lasting activity in reducing the blood pressure of spontaneous hypertensive rats as well as of the metacorticoid hypertensive rat. In spontaneous hypertensive rats at a dose of 200 mg./kg. p.o. the blood pressure was lowered from about 12 to 28% for periods of about 27 to 71 hours. The compounds would, therefore, be useful in the treatment of hypertension.

We claim:

1. A compound selected from the group consisting of compounds of the structure

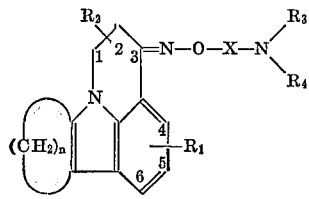

and their salts of pharmaceutically acceptable non-toxic acids, wherein $n$ is 5 or 6, $R_1$ is hydrogen, methyl, chloro or fluoro, $R_2$ is hydrogen or methyl, $R_3$ and $R_4$ are methyl or ethyl or $R_3$ and $R_4$ taken together with the N to which they are attached is pyrrolidino, and X is lower alkylene of 2–6 carbon atoms.

2. The compound according to claim 1 wherein,
$R_1$ is hydrogen, chloro, or fluoro,
$R_2$ is hydrogen, and
$R_3$ and $R_4$ are methyl.

3. The compound according to claim 2 wherein the $R_1$ group is in the 5-position.

4. The compound according to claim 1 wherein $R_1$ and $R_2$ are hydrogen and $R_3$ and $R_4$ are methyl.

5. The compound according to claim 4 wherein X is propylene and $n$ is 6.

6. The compound according to claim 4 wherein X is propylene and $n$ is 5.

7. The compound according to claim 4 wherein X is —CH$_2$—CH(CH$_3$)—CH$_2$— and $n$ is 6.

8. The compound according to claim 2 wherein $R_1$ is 5-chloro, X is propylene, and $n$ is 6.

9. The compound according to claim 2 wherein $R_1$ is 5-fluoro, X is propylene and $n$ is 6.

10. The compound according to claim 4 wherein X is pentamethylene and $n$ is 6.

References Cited
UNITED STATES PATENTS
2,707,681   5/1955   Raasch _____ 260—288 R
3,676,445   7/1972   Yale et al. _____ 260—288 R DONALD G. DAUS, Primary Examiner M. C. VAUGHN, Assistant Examiner U.S. Cl. X.R.

260—313.1, 289 R; 424—258